United States Patent
Tammariello et al.

(10) Patent No.: US 10,545,857 B2
(45) Date of Patent: Jan. 28, 2020

(54) CONTROLLING EXECUTIONS OF SYNCHRONOUS AND/OR NON-SYNCHRONOUS OPERATIONS WITH ASYNCHRONOUS MESSAGES

(71) Applicant: salesforce.com, inc., San Francisco, CA (US)

(72) Inventors: Christopher Tammariello, San Mateo, CA (US); Ashish Patel, Fremont, CA (US); Tuhin Kanti Sharma, San Mateo, CA (US); Michael Bartoli, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 245 days.

(21) Appl. No.: 15/686,005

(22) Filed: Aug. 24, 2017

(65) Prior Publication Data
US 2019/0065353 A1    Feb. 28, 2019

(51) Int. Cl.
*G06F 11/00* (2006.01)
*G06F 11/36* (2006.01)

(52) U.S. Cl.
CPC ...... *G06F 11/3688* (2013.01); *G06F 11/3684* (2013.01)

(58) Field of Classification Search
CPC .. G06F 11/3688; G06F 11/3684; G06F 11/36; G06F 11/3604; G06F 11/3608; G06F 11/3612; G06F 11/3664; G06F 11/3668; G06F 11/3672; G06F 11/3676; G06F 11/3692; G06F 11/3696; G06F 11/22; G06F 11/2205; G06F 11/2221; G06F 11/2247; G06F 11/2257; G06F 11/2268; G06F 11/2273; G06F 11/2289; G06F 11/2294; G06F 11/26; G06F 11/261; G06F 11/263; G06F 11/273; G06F 11/2733; G06F 11/2736; G06F 11/277; G06F 11/28

See application file for complete search history.

(56) References Cited

U.S. PATENT DOCUMENTS

| | | | |
|---|---|---|---|
| 7,779,302 B2* | 8/2010 | Fung | G06F 11/3672 |
| | | | 714/38.1 |
| 7,890,572 B2* | 2/2011 | Goodman | G06Q 10/107 |
| | | | 434/157 |
| 9,372,739 B2* | 6/2016 | Beardsmore | G06F 9/542 |

(Continued)

*Primary Examiner* — Anthony J Amoroso
(74) *Attorney, Agent, or Firm* — Wong & Rees LLP; Zhicong Gu

(57) ABSTRACT

Based on a test step execution order for a test case such as one against a database system, a specific test step to be executed next is identified. In response to identifying the specific test step, a test step message is published to indicate that the specific test step is to be executed next, which causes a subscriber of the test step message to execute the specific test step. In response to determining that the specific test step has ended, a dependent test step message is published accordingly to cause a subscriber of the dependent test step message to perform: determining whether a next test step should be executed following the specific test step in the test step execution order; in response to determining that a next test step should be executed, the foregoing may be repeated by using the next test step in place of the specific test step.

24 Claims, 9 Drawing Sheets

(56) References Cited

U.S. PATENT DOCUMENTS

2006/0036910 A1* 2/2006 Fung .................. G06F 11/3672
  714/25
2012/0254900 A1* 10/2012 Kumar ................ G06F 11/3476
  719/328
2017/0293551 A1* 10/2017 Shani ................. G06F 11/3688

* cited by examiner

US 10,545,857 B2

CONTROLLING EXECUTIONS OF SYNCHRONOUS AND/OR NON-SYNCHRONOUS OPERATIONS WITH ASYNCHRONOUS MESSAGES

TECHNICAL FIELD

The present invention relates generally to operation execution, and in particular, to controlling executions of synchronous and/or non-synchronous operations with asynchronous messages.

BACKGROUND

A computing system that processes massive volumes of transactions and interactions may comprise numerous software and hardware components distributed across a large number of computing nodes and networks. To verify that the system performs correctly and responsively, extensive and sophisticated testing need to be performed against some or all the components in the system regularly, on demand, or in development.

Typically, specific test code is written in various programming languages such as JAVA, C#, C++, etc., to support specific test cases against a system under test. If the system is developed by many developers and used by many users, the test code need to be designed, written and itself tested over and over again through tightly coupled cooperative and handholding efforts involving numerous people, organizations, and development teams. As the system evolves over time with new features, new components and new bug fixes, test code development efforts, preparing test data, coordinating different stakeholders in testing, and so forth, can consume significant personnel and non-personnel resources.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1A:
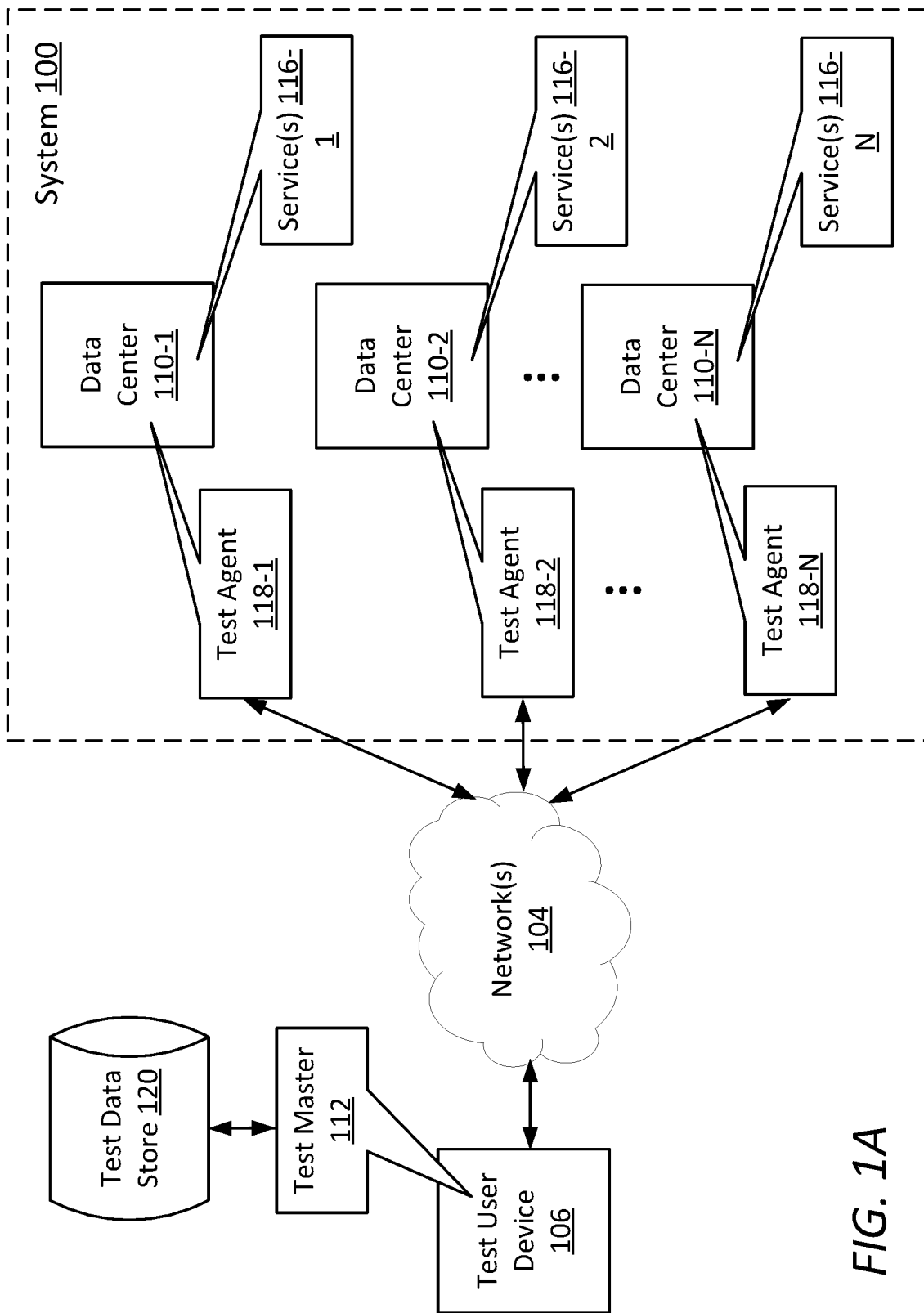
FIG. 1A illustrates an example stateless test execution framework comprising a test master and test agents.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1.0. General Overview
2.0. Functional Overview
   2.1. Test Tools and Proxy Agents
   2.2. Stateless Text Execution Framework
   2.3. RESTful Endpoints
   2.4. Test Cases
   2.5. Test Execution Model
3.0. Example Embodiments
4.0. Implementation Mechanism—Hardware Overview
5.0. Extensions and Alternatives

1.0 General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Under techniques as described herein, a highly efficient data-driven message-driven test execution model can be used to execute test cases against a system under test. Even if the system represents a complicated computing system such as a cloud-based computing system that supports massive volumes of concurrent and sequential transactions and interactions, the test execution model as described herein can be used to avoid writing customized test code that consumes significant resources to develop and maintain. In addition, the model can be used to test systems in development as well as in production.

In some embodiments, the test execution model as described herein is implemented by a test agent that can be deployed with any computing node in a public cloud, in a private cloud, in a combination of one or more public clouds and one or more private clouds, and so forth. Test definition data and test data for a test comprising a set of test cases such as those against a database system may be sent or submitted by a test master, for example over an HTTP-based or non-HTTP-based communication mechanism, and forwarded to the test agent that implements the test execution model. While executing the test or the test cases therein, the test agent has its own state for the test and executes the requested test without sharing the test execution state with the test master. Example test masters and test agents can be found in U.S. patent application Ser. No. 15/685,964, with an application title of "STATELESS SELF-SUFFICIENT TEST AGENTS" by Ashish Patel, Chris Tammariello, Michael Bartoli, Tuhin Kanti Sharma, and Vaishali Nandal, filed on Aug. 24, 2017, the entire contents of which are hereby incorporated by reference as if fully set forth herein.

In the test execution model as described herein, publishers and subscribers asynchronously publish onto or receive from a messaging bus (execution-control) messages for test cases and for test steps in a test case. While these messages can be published or received with asynchronicity, dependent or synchronous test steps in the test case can be assured to be executed in a correct test step execution order as needed in the test case such as a sequential test execution order and other orders.

The test execution model as described herein is well suited for multi-threaded execution. For instance, different threads/processes (e.g., as implemented by same or different objects/classes, etc.) can be used to handle (execution-control) message publications and receptions on a test case topic of a messaging bus for scheduling/executing different test cases. Additionally, optionally or alternatively, different threads/processes (e.g., as implemented by same or different objects/classes, etc.) can be used to handle message publications, receptions, test step executions, and so forth, related to a test step topic of the messaging bus for scheduling/executing test steps in different test cases. These different threads/processes can be started in a thread pool and/or can be spawned/created on demand or in response to messages to gracefully handle multiple test cases and multiple dependent and independent test steps therein as concurrently and as efficiently as feasible.

Under techniques as described herein, highly efficient parallel workflows can be supported for scheduling/executing independent test steps in a test case that have no sequential execution order, and allow the test steps to be executed at their own respective cadence or paces. Depending on availability of threads to the execution and execution time characteristics of software and/or hardware components under test, executions of these test steps in the parallel workflows can take their respective execution times. In operational scenarios in which the number of threads available is fewer than the number of the test steps in the parallel workflows, these test steps can be executed in any order that can be supported by the threads. For example, these test steps may be executed in the order in which messages for the test steps on the test step topic of the messaging bus are received. Additionally, optionally, or alternatively, these test steps may be executed in a different order (e.g., random order, non-random order, etc.) other than the order of message receptions on the test step topic of the messaging bus.

Highly efficient sequential workflows can also be supported for dependent test steps in a test case that have a specific test step execution order such as a sequential execution order, and handle execution of the dependent test steps based on asynchronously emitted messages (or events) in a semantically correct and highly efficient manner that respects and preserves execution order and/or dependency relationships among the dependent test steps as defined/specified in the test definition data received for the test case.

For sequential executions, test steps (or corresponding messages on the test step topic of the messaging bus) are published in the sequential execution order as their predecessor test steps are completed. This can be done because a (e.g., to be executed, currently being executed, etc.) test step (or a corresponding test step subscriber and/or dependent test subscriber) knows of the execution state of the test step, as well as knows of other test steps before and after itself in the sequential execution order based on the test definition data for the test case.

In some embodiments, the test step execution order such as the sequential execution order can be effectuated or realized through message-driven (or event-driven) operations performed by, and correlated between, a test step topic subscriber and a dependent test step topic subscriber.

For example, once the initial (e.g., very first, etc.) test step in the test case has been published to the test step topic and completed successfully, the initial test step—or the test step topic subscriber that receives a corresponding message on the test step topic of the messaging bus for the initial test step and executes the initial test step—can then publish a dependent test step (if any) immediately following the initial test step in the test step execution order in a message of the dependent test step topic onto the messaging bus.

If the last test step in the test case has completed or if any test step has failed, the dependent test step topic subscriber may cause a message of a test case completion topic to be published onto the messaging bus.

A test case completion subscriber, which listens for the message of the test case completion topic and any update thereof, determines a final test execution state of the test case. If it is determined that all test steps in the test case have completed successfully without failure, the test case completion subscriber determines that the test case has completed successfully. On the other hand, if it is determined that at least one test step in the test case has failed, the test case completion subscriber determines that the test case has failed. The final test execution state of the test case and test results for the test case may be generated accordingly and made available to a requester that causes the test case to be executed.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2.0 Functional Overview 2.1 Stateless Text Execution Framework

FIG. 1A illustrates an example stateless test execution framework comprising a test master 112 and one or more test agents (e.g., 118-1, 118-2, 118-3, etc.). This framework can be used to run a wide variety of focused and/or extensive tests against software and/or hardware components in system 100. Example systems may include, but are not necessarily limited to: any of: multitenant data service systems, web-based systems, systems that support massive volumes of concurrent and/or sequential transactions and interactions, database systems, and so forth.

In some embodiments, system 100 may comprise one or more data centers 110-1, 110-2, . . . 110-N, where N is a positive integer. Each of data centers may comprise respective software and/or hardware components to be tested by the test cases. Data center 110-1 deploys first services 116-1; data center 110-2 deploys second services 116-2; data center 110-N deploys N-th services 116-N. Other software and/or hardware components, assets, and so forth, of system 100 may be hosted in or outside these data centers, and may serve as test target under techniques as described herein. As used herein, a service may refer to a service with an HTTP interface, or a service with a non-HTTP interface. Additionally, optionally or alternatively, services that serve as test targets under techniques as described herein may be deployed anywhere, not necessarily inside data centers.

As used herein, the term "software components" may refer to one or more of: services with HTTP interfaces, services with non-HTTP interfaces, mobile applications, web-based applications, browser-based applications, user interfaces, plug-ins, APIs, operating systems, software libraries, computer executable codes, related non-executable data, application software, system software, embedded software, device drivers, microcode, computer clustering software, server processes, web servers, backend servers, database servers, databases, and so forth. The term "hardware components" may refer to one or more of: CPUs, controllers, microprocessors, FPGAs, ASICs, ICs, network processors, firmware, chipsets, interconnects, buses, RF integrated chips, graphic processors, computer memory, fixed and removable storage media, peripherals, and so forth.

Under techniques as described herein, test master 112 and test agents (e.g., 118-1, 118-2 . . . , 118-N, etc.) operate within a stateless framework that is agnostic to specific network setups. The one or more computer networks 104 through which test master 112 and test agents (e.g., 118-1, 118-2 . . . , 118-N, etc.) communicate may refer to any combination of one or more of: the Internet; intranets, extranets, virtual private networks (VPNs), local area networks (LANs), wide area networks (WANs), wireless networks, wireline networks, client-server, mobile networks, public networks, carrier-class networks, access networks, enterprise networks, proprietary networks, or the like.

Test master 112 can be deployed at a test user device 106, which represents a computer device that may or may not co-located with any of the test agents (e.g., 118-1, 118-2 . . . , 118-N, etc.). Example test user devices may include, but are not necessarily limited to only, any of: a computer server, a handheld computing device, a mobile device, a wearable device, a laptop computer, a work station, a desktop personal computer, a PDA, a cell phone, a tablet, a PC, or any device or any computing device capable of interfacing directly or indirectly to test agents as described herein for the purpose of running test cases against software and/or hardware components under test in system 100. In some embodiments, test master 112 may be deployed on any device which supports a JAVA virtual machine (JVM). Additionally, optionally or alternatively, test master 112 may be hosted on one or more server devices that host or provide one or more data repositories such as relational or non-relational databases for storing test related data. In some embodiments, test master 112 can be hosted on a web server and can be accessed through HTTP or REST endpoints.

The test agents (e.g., 118-1, 118-2 . . . , 118-N, etc.) can receive test execution requests from test master 112, and then execute tests as requested by the test execution requests in complete independence of test master 112. Final test statuses and related test results of the requested tests may be made available or sent to test master 112, for example, as responses to the test execution requests.

For example, to execute a specific test against specific software and/or hardware components under test in system 100, test master 112 retrieves test definition data and test data for the test from a test data store 120. Test master 112 can further identify a set of one or more candidate test agents that are configured to execute the test, for example based on agent configuration and status data retrieved from an accessible data store such as test data store 120. Example agent configuration and status data may include, but is not necessarily limited to only, any of: test capabilities of test agents in relation to the specific test, locations of test agents in relation to the specific test in relation to locations of the software and/or hardware components under test, etc.

Test master 112 can select any test agent in the set of candidate test agents to execute the test, and send a request for executing the test to the selected agent over one or more computer networks 104. The request for executing the test includes, but is not necessarily limited to only, any initial test data needed by the recipient test agent for scheduling and executing the test.

In response to receiving the request for executing the test, the test agent (e.g., 118-1, 118-2 . . . , 118-N, etc.) performs a series of operations to carry out the requested test. In some embodiments, the series of operation is performed by the test agent (e.g., 118-1, 118-2 . . . , 118-N, etc.) without further interactions between the test agent (e.g., 118-1, 118-2 . . . , 118-N, etc.) and test master 112 after the request for executing the test was received.

The series of operations performed by the test agent (e.g., 118-1, 118-2 . . . , 118-N, etc.) independently may include, but are not necessarily limited to only, one or more of: determining a set of test cases to be run in the test, determining a time schedule for executing each test case in the test, determining a complete set of test steps for each test case in the test, determining a complete set of test data used to initiate or execute the complete set of test steps for each such test case, executing the complete set of test steps for each such test case with the complete set of test data, generating a final test execution status for each such test case, causing the final test execution status and related test results for each such test case to be made available or returned to test master 112, and so forth.

Under the stateless test execution framework as described herein, once the request for the test is received by the test agent (e.g., 118-1, 118-2 . . . , 118-N, etc.), no coupling or interaction between the test agent (e.g., 118-1, 118-2 . . . , 118-N, etc.) and test master 112 is needed for the test agent (e.g., 118-1, 118-2 . . . , 118-N, etc.) to carry out executing the test. Even if test master 112 fails or otherwise becomes incommunicado with the test agent (e.g., 118-1, 118-2 . . . , 118-N, etc.), the test agent (e.g., 118-1, 118-2 . . . , 118-N, etc.) requested to perform the test can continue to schedule and execute all the test cases in the test, and carry out executing these test cases to their respective completions. When a new instance of test master 112 starts up or an existing instance of test master 112 recovers, test master 112 can send a new request to retrieve the final test execution status and the related test results for each test case in the test previously requested by a prior reincarnation of test master 112.

For the purpose of illustration only, FIG. 1A depicts a test agent for each data center. It should be noted, however, that in general, test agents may be deployed in same or different locations other than those implying a one-to-one relationship with data centers. In various embodiments, zero, one, or more test agents may be deployed at a data center. For example, a test agent pool comprising multiple test agents of similar capabilities may be deployed at a data center. Additionally, optionally or alternatively, another data center may be devoid of any locally deployed test agent. In some embodiments, a test agent at a data center may be used to test software and/or hardware components in system 100. In some embodiments, a test agent remote to a data center may be used to test software and/or hardware components in system 100. In some embodiments, test agents may be deployed at likely locations where potential users of system 100 are located so that functionality (or logic) and/or responsiveness can be tested with respect to certain software and/or hardware components in system 100.

2.2 RESTful Endpoints

Figure 1B:
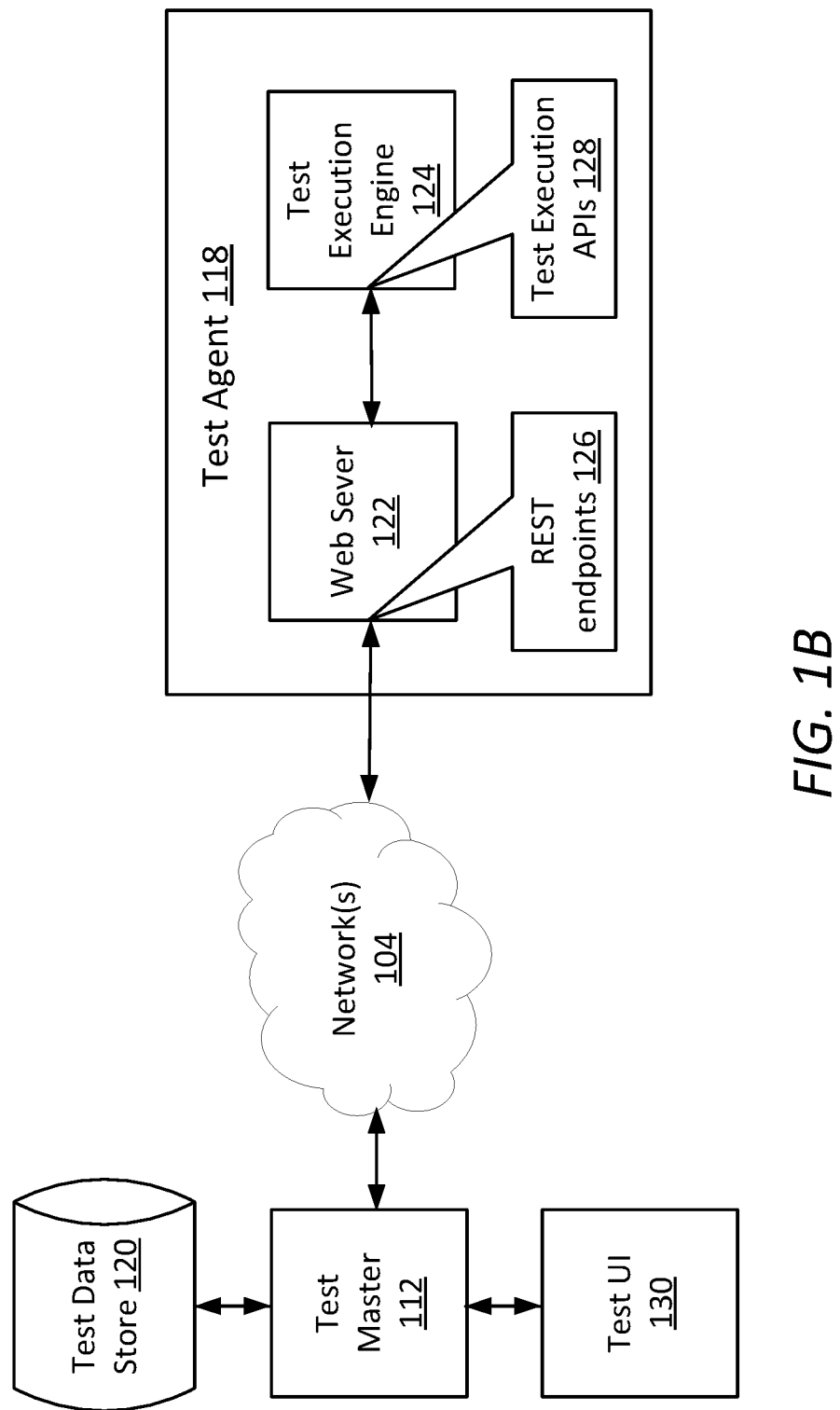
FIG. 1B illustrates an example test agent that interacts with test master for executing tests.

FIG. 1B illustrates an example test agent 118 that interacts with test master 112 for executing tests. As illustrated, test agent 118 comprises or implements a web server 122 and a test execution engine 124. Test execution engine 124 implements test execution functionality such as scheduling tests, executing tests, updating tests and test cases therein, reporting test execution statuses and results, and so forth. The test execution functionality implemented by the test execution engine 124 of test agent 118 may be exposed to web server 122 as one or more test execution Application Programming Interfaces (APIs) 128.

Test execution API calls 128 (e.g., implemented as HTTP-based RESTful APIs, etc.) exposed to web server 122 by test execution engine 124 may be indirectly exposed by web server 122 as HTTP-based endpoints/resources such as RESTful endpoints 126. These RESTful endpoints 126 are addressable by a web application or a web browser on any device directly or indirectly capable of establishing a web-based data connection with web server 122, including but not limited to: test master 112, another instance of test master 112 on a different device, and so forth.

Each of RESTful endpoints 126 may be addressable with an HTTP-based REST request including but not necessarily limited to only the following data items: a corresponding base Universal Resource Locator (URL) such as "https://txapi.force.com/resources/" that identifies a REST resources location for test execution; an internet media type that defines REST state transition data elements for test execution such as JSON, a XML file, a flat file database, and so forth; a standard HTTP method such as OPTIONS, GET, PUT, POST, and DELETE; etc.

In some embodiments, some or all of the RESTful endpoints may be publicly accessible. In some embodiments, some or all of the RESTful endpoints may be accessible by test master 112 through one or more private, proprietary, and/or specifically provisioned, data connections. In some embodiments, some or all of the RESTful endpoints may require authentication and/or authorization. One or more authentication and/or authorization mechanisms that can operate with HTTP or HTTP-based REST operations can be used before an API call can be successfully invoked indirectly by an HTTP request from test master 112 to web server 122. In some embodiments, some or all of the endpoints invoke API calls that execute tests accessing one or more of: test and/or production data owned by a service provider, test and/or production data owned by a user system of a service provider, data maintained at a specific data center or data store, data maintained at multiple data centers or data stores, and so forth.

At runtime, test master 112 may determine/select a RESTful (test execution) endpoint for scheduling a specific test to be executed by test agent 118. For instance, test master 112 may determine a set of data items to be included with an HTTP request such as the base URL of RESTful endpoints 126, a path (e.g., to be concatenated to the base URL, etc.) for the RESTful endpoint among the RESTful endpoints 126, REST state transition data elements (e.g., test definition data, test data, in JSON, in XML, in a flat file database format, etc.), a standard HTTP method of POST, and so forth.

Test master 112 generates an HTTP-based REST request based on a URL constructed from the base URL and the path, the REST state transition data elements (e.g., in JSON, in XML, in a flat file database format, etc.), the HTTP method, and so forth, and sends the HTTP-based REST request to web server 122 to cause web server 122 to invoke a call to a corresponding test execution API among test execution API 128 exposed to web server 122 by test execution engine 124.

In some embodiments, the HTTP-based REST request comprises test definition data that identifies the set of test cases, test steps in each test case in the set of test cases, test data to be used in each, some, or all of the test cases and/or the test steps in the test, and so forth. Some or all of the test definition data and the test data received as a part of the HTTP-based REST request from test master 112 may be passed to test execution engine 124.

The test may comprise a set of one or more test cases. For instance, a first test case in the test may be to execute one or more first test transactions and/or interactions with data center 110-1 of FIG. 1A; a second test case in the test may be to execute one or more second test transactions and/or interactions with data center 110-2 of FIG. 1A; a third test case in the test may be to execute one or more third test transactions and/or interactions with data center 110-1 of FIG. 1A.

In response to invoking the specific API call by web server 122, test agent 118-1, or test execution engine 124 therein, performs a series of operations to schedule and/or carry out the requested test, as previously discussed. In some embodiments, the series of operation is performed by the test agent (e.g., 118-1, 118-2 . . . , 118-N, etc.) without further interactions between the test agent (e.g., 118-1, 118-2 . . . , 118-N, etc.) and test master 112.

In some embodiments, a final test execution status and some or all of test results from executing the set of test cases of the test may be provided by test execution engine 124 as return code or return data in the call to the corresponding test execution API to web server 122. Web server 122 may cache/store the final test execution status and some or all of the test results as REST resources that can be accessed or retrieved through HTTP-based REST GET operations from the REST resources location of web server 122. Some or all of the REST resources cached/stored by web server 122, including but not necessarily limited to only the final test execution status and the test results, may be returned in an HTTP-based REST response (or simply HTTP response) to test master 112 in response to the HTTP-based REST request for the test.

If test master 112 fails or otherwise becomes incommunicado with test agent 118, the HTTP-based REST response sent by test agent 118, or web server 122 operating in conjunction with test agent 118, may fail to reach test master 112. In some embodiments, a new instance or a recovered instance of test master 112 or another test master (e.g., from the same test user device, from a different test user device, etc.) may retrieve information from HTTP-based REST responses by querying the REST resources cached/stored by web server 122 with HTTP-based REST request with GET methods/operations.

For example, the test master 112, after being restored or restarted, can issue a new HTTP-based REST request to receive a new HTTP-based REST response that comprises information in the failed HTTP-based REST response. For instance, the new HTTP-based REST request may be generated based on the base URL of RESTful endpoints 126, the same path (e.g., to be concatenated to the base URL, etc.) for the specific RESTful endpoint among the RESTful endpoints 126 that was used to request executing the test, a standard HTTP method of GET, and so forth.

2.3 Test Definition Data and Test Data

In some embodiments, test execution engine 124 may be implemented with computer code that performs test transactions and test interactions based on the test definition data and the test data forwarded by web server 122 in the API call invoked by web server 122. Example test transactions and test interactions may include, but are not necessarily limited to only, any of: transactions and interactions using production data (e.g., actual data generated by users, etc.), transactions and interactions using test data (e.g., synthesized data to cover special or general data values or special or general application logic, etc.), transactions and interactions using software and hardware components in a production environment, transactions and interactions using software and hardware components in a development environment, transactions and interactions involving user input, transactions and interactions between backend servers, any combination of the foregoing, and so forth.

Test definition data and test data can be used to enable a test agent to execute a test independent of a test master while the test is being executed. For example, test execution engine 124 may be used to execute one or more test cases that comprise test transactions and test interactions that simulate transactions and interactions supported by user applications that run on user systems and that are used by users to access the subscribed services. Data representing user input in the test may be provided as a part of the test data originally in REST data elements (e.g., in JSON, in XML, in a flat file database format, etc.) and forwarded in the API call to test execution engine 124. The REST data elements as described herein can be used to include complete replications of view forms, which might be otherwise entered by a test user by hand under other approaches. Thus, based on the complete replications of the view forms (e.g., with synthesized data designed to test specific value range or specific logic of system 100, etc.), the test execution engine 124 can store the complete replication of the view forms in memory after the HTTP request causes a corresponding test execution API to be invoked (or called), and execute test steps without going back to test master 112 for additional user input for the view forms.

To simulate the transactions and interactions comprising dependency relationships, the test definition data may identify a set of dependent and/or independent test steps for each test case to be run in the test. The test definition data may identify specific relationships between and/or among the test steps in terms of timing, data, and other dependencies.

In executing a test case, based on the test definition data and the test data, test execution engine 124 guides the test case through relatively controlled test execution paths that purposefully exercise specific logic under test that is supported or implemented by one or more software and/or hardware components in system 100.

For example, test execution engine 124 may perform a first test step of a test case to interact with a set of specific software and/or hardware components under test in system 100 to execute a specific API call implemented or performed by the specific software and/or hardware component(s) under test with specific test data portions received in the test data or generated in prior dependent test steps (prior to the first step). The specific software and/or hardware components under test may return a status code and other related information in the specific API call. Test execution engine 124 may analyze the status code and return information, and perform a second test step of the test case to interact with a new set of specific software and/or hardware components under test in system 100 to execute a new specific application programming interface (API) call with new specific test data portions received in the test data or generated in prior dependent test steps (prior to the second step). Thus, while executing the test case, for the purpose of guiding the test case through the predesignated test execution paths, test execution engine 124 can maintain test execution state information in relation to the test case independent of test master 112.

2.4 Test Cases

Under techniques as described herein, test cases involving diverse types of tests and diverse types of test subjects can be developed/created in a data file, without any need to write test tool code for these test cases in a programming language such as JAVA, C#, C++, etc. The data file may be, without limitation, a human readable file, a binary data file, etc. In some embodiments, test definition data and test data for a test or test cases therein can be defined/specified with a data description language or a data interchange format including but not limited to JavaScript Object Notation (JSON), a XML file, a flat file database, etc. A test user can interact with a test user interface (e.g., 130 of FIG. 1B, etc.) of a test master to generate, update and/or delete the test cases (as specified/defined in the test definition data) and the test data, instead of or in addition to directly operating the data file that is used to specify/define the test cases and the test data.

A test case as described herein is (e.g., fully, completely, etc.) specified and defined in portions of the test definition data and the test data that are related to the test case. Test steps in the test case can use the test data to generate intermediate test data as needed. The test data as related to the test case may comprise test data portions to be used by some or all of test steps in the test case. The test data as related to the test case may comprise test data portions to be used by some or all of a sub-step in a single test step in the test case. This allows a test execution engine as described herein to execute autonomously, including but not limited to, execute each test step of the test case and generate any intermediate data needed to carry out each test step of the test case, without further interacting with a test master that made the original request for executing the test case while the test case is being executed by the test execution engine. More specifically, the test definition data and the test data as related to the test case represent metadata used in a data-driven message-driven test execution model as described herein to (e.g., fully, completely, etc.) control workflows of test execution at runtime for the test case and the test steps therein.

Example test cases may include, but are not necessarily limited to only, synthetic web transactions against endpoints of web-based applications or services in order to measure and assess health and performance of the applications or services. In some embodiments, some or all of the synthetic web transactions executed in the test execution model as described herein can be developed and curated by test users who own the applications or services and would like to have a particular level of monitoring for their applications or services.

Figure 2A:
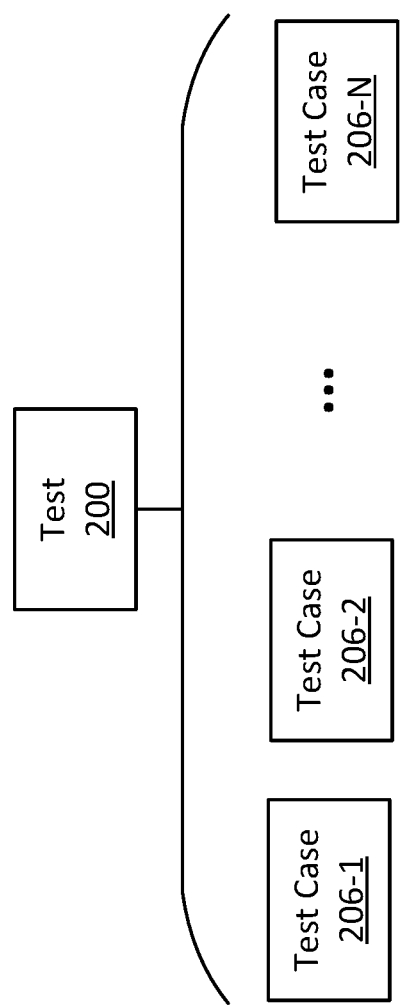
FIG. 2A through FIG. 2C illustrate example test and test cases with dependent test steps and independent steps.

FIG. 2A illustrates an example test 200 that comprises a set of one or more test cases 206-1, 206-2, . . . 206-N, where N is a positive integer no less than one (1). A test case, such as a synthetic web transaction and so forth, may comprise a set of one or more individual test steps. Some or all of the individual test steps in the test case may be executed in any order. Some or all of the individual test steps in the test case may need to be executed in a sequential execution order (or in a sequential execution chain). Test steps that need to be sequentially executed may convey their respective test step execution states including some or all of data in the test steps (e.g., received responses to requests made in a synthetic web transaction, etc.) to other test steps down in the sequential order. Test steps collectively may be used to assess an overall test execution state (e.g., via a final test case execution status, etc.) of services or applications under test.

In some embodiments, the test execution model as described herein can be designed and implemented in a way that is agnostic to types of test cases and dependency relationships between or among test steps in the test cases. Such test case may comprise any combination of: test steps that are completely independent from one another, test steps that are sequentially ordered, test steps that are partially sequentially ordered and partially independent.

In some embodiments, some or all of the test cases as described herein may be accompanied with individual timing information (or individual time constraints) in test definition data and/or test data for the test. The test definition data and/or the test data may be derived/generated from payloads (e.g., REST data elements, JSON key-value pairs, a flat file database, etc.) of an original request for executing the test by way of input data/parameters in a corresponding test execution API call.

Example individual timing information may include individual allocated time durations (e.g., one (1) minute for the first test case in the test, five (5) minutes for the second test case, to be executed at the one-minute mark, to be executed at the five-minute mark, etc.) for respective test cases to complete, specific individual start times for respective test cases to start, specific individual end times for respective test cases to end, and so forth. The individual timing information may be used to schedule the test cases and determined whether any of these test cases has failed by timeout (or exceeding the allocated time durations; or ending after the specified ending times) or by any other reason.

Test definition data and/or test data as described herein, including but not necessarily limited to only, any combination of: key-value pairs such as in JSON, markup tags such as in XML, data values in flat file database formats, and so forth. In some embodiments, the test execution engine may, but is not limited to, run in JAVA virtual machine (JVM). Some or all portions of test definition data and test data as related to a test case may be cached in memory while the test case is being executed by the test execution engine. In some embodiments, classes/objects, threads, processes, etc., that are implemented (e.g., as publishers and/or subscribers of a messaging bus as described herein, etc.) in the test execution engine can access data items in the test definition data and test data as cached in the memory, for example with pointers, references, and so forth.

Similarly, in some embodiments, some or all of test steps in a test case may be accompanied with individual timing information in test definition data and/or test data for the test case. Example individual timing information may include individual allocated time durations (e.g., ten (10) second for the first test step in the first test case, fifteen (15) seconds for the second test step in the third test case, etc.) for respective test steps to complete, specific individual start times for respective test steps to start, specific individual end times for respective test steps to end, and so forth. The individual timing information may be used to schedule the test steps and determined whether any of these test steps has failed by timeout or by any other reason (or exceeding the allocated time durations; or ending after the specified ending times).

Figure 2B:
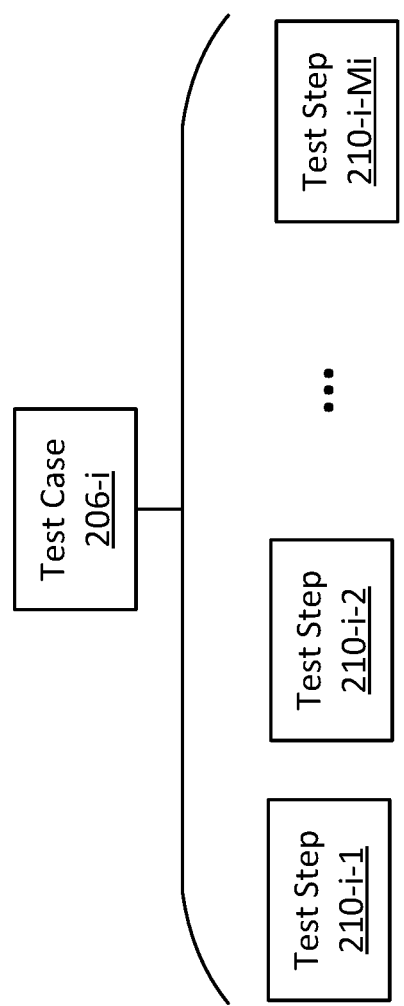

FIG. 2B illustrates an example test case 206-*i* that comprises one or more test steps 210-*i*-1, 210-*i*-2, . . . 210-*i*-Mi, where Mi is a positive integer no less than one (1). In some embodiments, the test steps 210-*i*-1, 210-*i*-2, . . . 210-*i*-Mi are independent from one another and do not need to share test states between and among themselves and can be executed in any order. In the test execution model as described herein, these (e.g., independent, non-synchronized, etc.) test steps in test case 206-*i* can be executed in parallel, in series, or partly in parallel and partly in series, for example depending on the availability of computing resources available to a test execution engine as described herein, response times (e.g., transmission times, processing times, etc.) of software and/or hardware components under test, and other factors. For example, test case 206-*i* may be used to test different web services of one or more service providers, and may comprise independent (non-synchronized) test steps such as accessing web-based news provided by the service providers, web-based financial information provided by the service providers, web-based ports information provided by the service providers, and so forth.

Figure 2C:
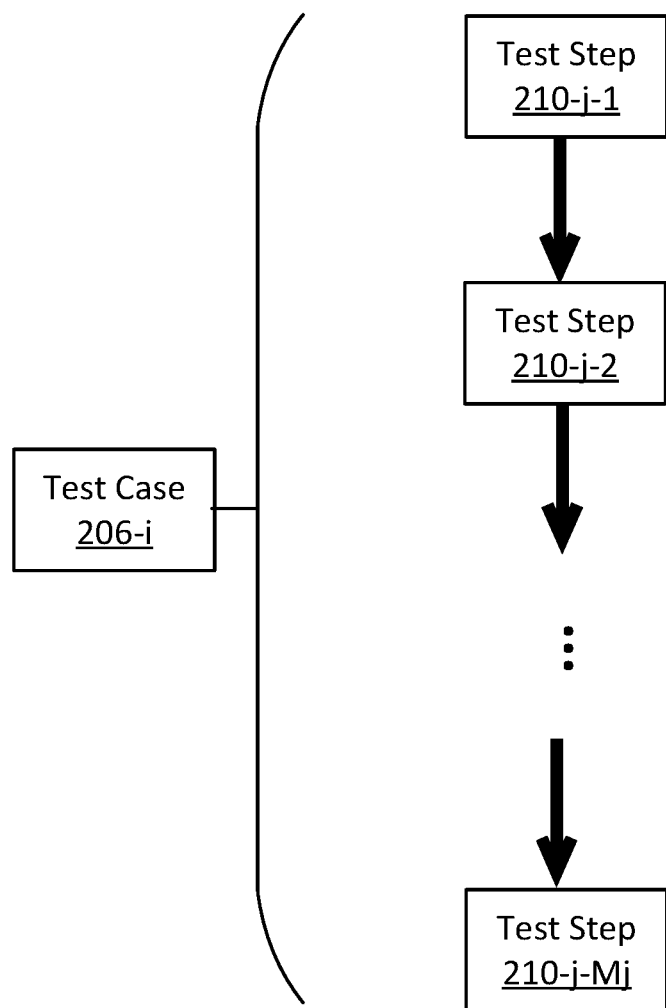

FIG. 2C illustrates an example test case 206-*j* that comprises one or more test steps 210-*j*-1, 210-*j*-2, . . . 210-*j*-Mj, where Mj is a positive integer no less than one (1). In some embodiments, the test steps 210-*j*-1, 210-*j*-2, 210-*j*-Mj are dependent from one another and need to share test states between and among themselves and need to be executed in a specific test step execution order such as a sequential execution order and so forth. For example, test case 206-*j* may be a synthetic (or artificial) online shopping transaction comprising dependent (or synchronized) test steps such as loading a landing page of a web-based server system, completing a login into the web site, viewing menus for performing various functions, selecting a reporting function to view a report, logging out, and so forth.

2.5 Test Execution Model

Figure 3A:
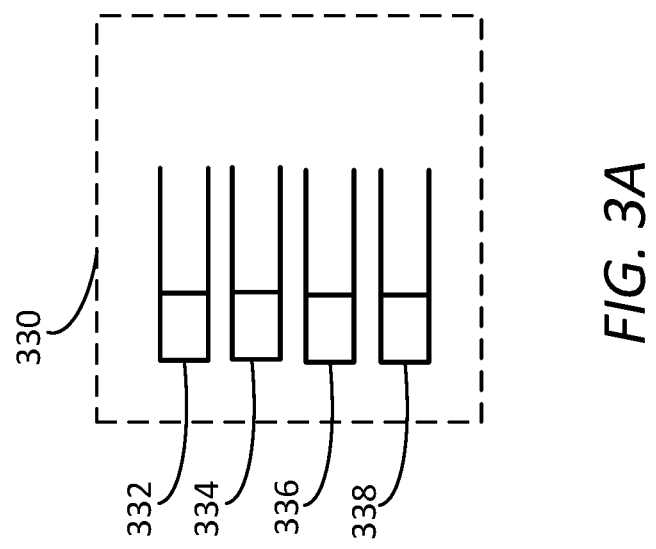
FIG. 3A and FIG. 3B illustrate an example messaging bus and an example test execution model with which synchronized or dependent test steps and parallel or independent test steps can be executed.

FIG. 3A illustrates an example messaging bus (or event bus) 330 that can be used to publish and receive messages of different topics. In some possible embodiments, these topics comprise a test case topic 332, a test step topic 334, a dependent test step topic 336, a test case completion topic 338, and so forth. In some embodiments, messaging bus 330 can be implemented (e.g., using event-driven programming, message-driven programming, a Reactor-based design, AJAX, Java Event Bus, etc.) in a test execution engine of a test agent as described herein to support non-blocking real time or near real time operations in publishing and receiving/retrieving published images by objects/classes, threads, processes, and so forth, in the test execution engine.

Figure 3B:
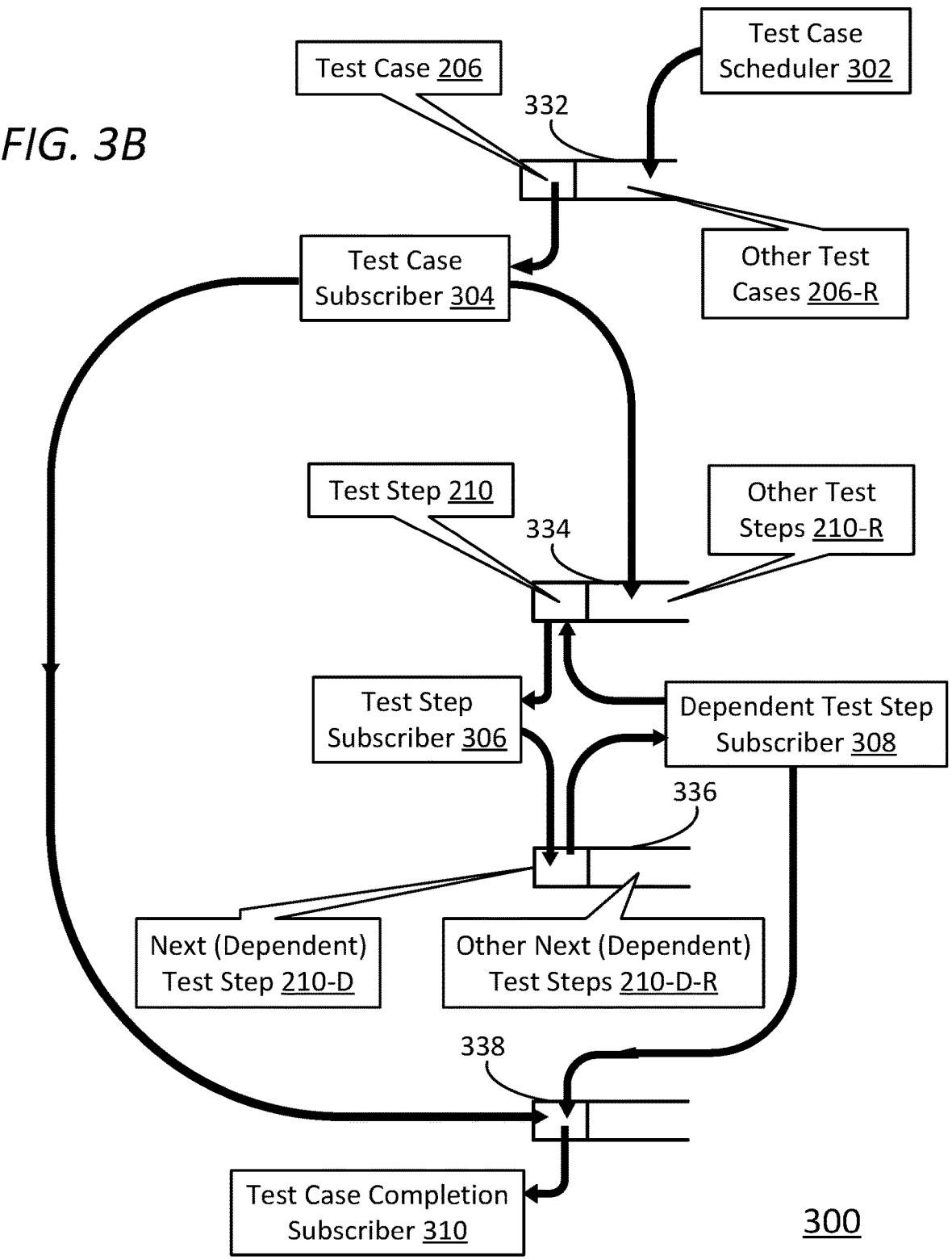

FIG. 3B illustrates an example test execution model 300 that can be implemented by the test execution engine of the test age to schedule and execute test cases and test steps therein.

As illustrated, in test execution model 300, a test case scheduler 302 publishes (e.g., according to specified start times, immediately after a test case in the same test has completed or failed, etc.) test case 206 and other test cases 206-R (if any) for execution as (test-case-execution-control) messages on test case topic 332 to messaging bus 330. Each of the messages published on the test case topic may include test definition data and test data for a test case (e.g., 206, etc.). The test definition data and the test data for the test case may be sent by a test master to a web server operating with a test agent, and passed in a test execution API call to the test execution engine of the test agent that implements test execution model 300.

Test cases 206 and 206-R (or the corresponding published messages of test case topic 332) are subsequently (e.g., immediately, in real time, in near real time, in advance, on demand, etc.) received by test case subscribers (or test case receivers). For instance, a test case subscriber 304 receives the message (of test case topic 332) that corresponds to test case 206. In response to receiving test case 206 (or the corresponding message of test case topic 332), test case subscriber 304 can inspect test steps of test case 206 based on test definition data and test data (which is a portion of the test definition data and test data passed in the test execution API call) for test case 206, and determine whether the test steps in test case 206 need to be executed in any order or in a specific test step execution order such as a sequential execution order.

In some embodiments, if it is determined that the test steps in test case 206 need to be executed in the sequential execution order, the initial (or very first) test step in the sequential order is published (e.g., according to a specified start time, immediately after a test case is received in the message of test case topic 332, etc.) by test case subscriber 304 as a (test-step-execution-control) message of test step execution topic 334 onto messaging bus 330. Else if it is determined that the test steps in test case 206 can be executed in any order, some or all of the test steps in test case 206 may be published by test case subscriber 304 as (test-step-execution-control) messages of test step execution topic 334 onto messaging bus 330.

In some embodiments, test case scheduler 304 creates and publishes a message of test case completion topic 308 onto messaging bus 300, indicating that test case 206 has started being executed. A test case completion subscriber 310 can determine a final test execution state of test case 206 by listening to the message of test case completion topic 338 for test case 206 (and any update of that message) until the message of test case completion topic 338 for test case 206 indicates that test case 206 has completed successfully or failed.

One or more test step subscribers listen for messages of test step topic 334 on messaging bus 330. For example, a test step subscriber 306 among all the test step subscribers receives a test step 210 (or a message of test step topic 334 that corresponds to the test step) in test case 206. Test step 210 may be the initial test step of test case 206 or a subsequent test step (after all prior test steps have been executed) if test steps in test case 206 are determined to be executed in the sequential execution order, or any of the test steps in test case 206 (regardless of whether any other test steps have been executed) if the test steps in test case 206 are determined to be executed in any order.

In responding to receiving test step 210, test step subscriber 306 proceeds to execute test step 210, which exercises/tests some or all of the software and/or hardware components under test. If test step 210 has not finished and has not timed out, the message (of test step topic 334) indicating test step 210 being executed remains on messaging bus 330. On the other hand, if test step 210 has finished or has timed out, test step subscriber 306 publishes test step 210 in a (dependent-test-step-execution-control) message of dependent test step topic 336 onto messaging bus 330.

One or more dependent test step subscribers listen for messages of dependent test step topic 336 on messaging bus 330. For example, a dependent test step subscriber 308 among all the dependent test step subscribers receives test step 210 (or the message of dependent test step topic 336 that corresponds to test step 210) in test case 206.

In response to receiving the message of dependent test case topic 336 for test step 210, dependent test step subscriber 308 proceeds to assess the state of execution for test step 210 indicated in the message of dependent test case topic 336, and determine a dependent test step if any (or a non-existent or null test step if none is found) in the sequential execution order if test step 210 is completed successfully, as follows.

First, dependent test step subscriber 308 determines whether test step 210 (e.g., the initial test step, a subsequent test step, the last test step, etc.) is the last test step (note that each test step in the parallel execution order or in any order may be considered the last test step; additionally, optionally or alternatively, any remaining to-be-executed test step in the parallel execution order or in any order may be selected as the next test step since test steps in the parallel execution order can be executed in any order).

Dependent test step subscriber 308 further determines whether test step 210 has completed successfully or failed. If it is determined that test step 210 is not the last test step AND that test step 210 has completed successfully, dependent test step subscriber 308 assumes the role of a test step topic publisher for test case 206 and updates/publishes the message of test step topic 334 on messaging bus 330 to indicate the (e.g., immediately) next test step in the sequential execution order as the new test step to be executed. In some embodiments, if the test steps in test case 206 is in the parallel execution order (or in any order), dependent test step subscriber 308 need not to publish/update the message of test step topic 334 on messaging bus 330.

The next test step (or the new test step) may be, without limitation, determined based on a test step number in a set of ordered test step numbers assigned to dependent test steps in the test case. Additionally, optionally or alternatively, other data items such as test step index, order token, and so forth, may be used to identify/determine the next test step (or the new test step), for example in the sequential execution order.

Test step subscriber 306 listens for the message of test step topic 334 and any update of that message. In response to receiving the updated message (or a new message) of test step topic 334 that previously indicated test step 210 and now indicates the next test step (or the new test step) in the sequential execution order, test step subscriber 306 execute the new test step. The same processing with respect to (previous) test step 210 may be repeated with respect to the next test step (or the new test step) by test step subscriber 306 and dependent test step subscriber 308 until all the test steps in the sequential (test step) execution order for test case 206 have finished successfully or failed (e.g., timed out, for any other reasons, etc.).

Under techniques as described herein, the next test step (or the new test step) can be determined relatively efficiently. In some embodiments, rather than iterating through a list of test steps in O(n) to determine the next test step to publish a corresponding message, dependent test step subscriber 308, which is also a publisher for test step topic 334, can access and determine the next test step in O(1) time, since dependent test step subscriber 308 already knows the test step number, test step index and/or order token of test step 210 (or the current test step), which can be simply incremented to derive the test step number, test step index and/or order token of the next test step (or the new test step). Thus, in these embodiments, the next test step (e.g., in the sequential execution order, etc.) can be efficiently determined based on the current test step number, the current test step index, and so forth, of the test step that has just completed and that precedes the next test step (or the new test step).

Second, if it is determined that test step 210 is the last test step AND that test step 210 has completed successfully, dependent test step subscriber 308 does not publish any more test steps in the test case on test step topic 334 of messaging bus 330. Instead, dependent test step subscriber 308 assumes the role of a test case completion topic publisher for test case 206 and republishes/updates the message of test case completion topic 338 on messaging bus 330 to indicate that test case 206 has successfully completed.

Third, if it is determined that test step 210 has failed, dependent test step subscriber 308 does not publish any more test steps in test case 206 on test step topic 334 of messaging bus 330. Instead, dependent test step subscriber 308 assumes the role of the test case completion topic publisher for test case 206 and publishes a message of test case completion topic 338 on messaging bus 330 to indicate that test case 206 has failed.

In response to receiving the updated message (or a new message) of test case completion topic 338 on messaging bus 330 as published/republished/updated by dependent test step subscriber 308, test case completion subscriber 310 can proceed to determine the final test execution status of test case 206. In some embodiments, this determination may be based on a combination of 1) the message on the test case completion topic and 2) test results and test step execution statuses cached/stored with respective application objects/classes, threads and/or processes implemented as a part of the test execution engine of the test agent.

As discussed, the test case completion message (or event) or any update thereof can be used as a trigger for test case completion subscriber 310 to check or determine the overall state of asynchronous executions of all the test steps of test case 206. The test case completion message is itself an asynchronously executed or emitted message. Test case completion subscriber 310 need not to consume much computational and/or memory resources while it waits for a test case to end execution (e.g., completed successfully or failed, etc.). Test case completion subscriber 310 may or may not utilize a full thread, and may operate at its own cadence or pace. Test case completion subscriber 310 can wake up to receive updates to the message of test case completion topic 338 as soon as the updates of the message arrives, or wake up when a previously set timer is fired to check the message and to re-set the timer if it is determined that test 206 has not failed and that some test steps in test case 206 remain to be executed.

In some embodiments, to make the (e.g., message-driven, event-driven, etc.) test execution model relatively robust, message refreshing timers (or timeouts) of various time granularities may be implemented to deal with any unexpected hanging or delays with respect to executing test cases and/or test steps.

For example, for a test step or a test case that takes a long time to execute, dependent test step subscriber 308 may refresh/republish (e.g., with a different message refresh time stamp, etc.) the message of test case completion topic 338 on messaging bus 330 initially published by test case subscriber 304, until an allocated time duration/budget for any test step or test case 206 has completely elapsed. If the allocated time duration/budget for the test step or the test case has completely elapsed, the test step or test case 206 may be determined to have failed or have timed out.

Additionally, optionally or alternatively, other timers (or other time outs) may be used for refreshing/republishing messages on other topics of the messaging bus in addition or instead of test case completion topic 338.

Test execution model 300 can readily support multi-threaded execution of test cases and test steps therein. For instance, different threads/processes (e.g., as implemented by same or different objects/classes, etc.) can be used to handle message publications and receptions on test case topic 332 of messaging bus 330 for scheduling/executing different test cases such as test cases 206-R concurrently while test case 206 is being executed. Additionally, optionally or alternatively, different threads/processes (e.g., as implemented by same or different objects/classes, etc.) can be used to handle message publications, receptions, test step executions, and so forth, related to test step topic 334 of messaging bus 330 for scheduling/executing test steps in different test cases such as test steps 210-R and 210-D-R concurrently while test step or its subsequent/dependent test steps (e.g., 210, 210-D, etc.) are being executed. These different threads/processes can be started in a thread pool and/or can be spawned/created on demand to gracefully handle multiple test cases (e.g., 206, 206-R, etc.) and multiple dependent and independent test steps (e.g., 210, 210-R, etc.) therein as concurrently and as efficiently as feasible.

Under techniques as described herein, each of test case schedulers (e.g., 302, etc.), test case subscribers (e.g., 304, etc.), test step subscribers (e.g., 306, etc.), dependent test step subscribers (e.g., 308, etc.), test case completion subscribers (e.g., 310, etc.), and so forth, can be implemented as micro-executors that perform microservices that in aggregate amount to a full test case execution service. Such micro-executors can start executions, without waiting, of their respective microservices based on asynchronous messages subscribed to and received by the micro-executors, as soon as the messages are emitted.

Based on this test execution model, various types of test cases, whether they comprise dependent (or synchronized) test steps and/or independent (or non-synchronized) test steps, can be efficiently executed. Each of these test cases, whether test steps therein are synchronously executed or executed in parallel, may be executed with high efficiency.

The test execution model can be scaled up to handle numerous test cases concurrently or in sequence, commensurate with scales and functional complexities of various systems under test. Each of messages of test case topic 332 and test case completion topic 338 may comprise test case identification information that uniquely identifies a corresponding test case among all test cases to have been received by a test agent for execution. Each of messages of test step topic 334 or test step topic 336 may comprise test step identification information that uniquely identifies a corresponding test step among all test steps in a test case.

Messages on a messaging bus as described herein can be easily handled by multiple threads and/or multiple processes and/or multiple computing processors. For example, multiple test case schedulers can be used to publish new test cases of the test case topic onto the messaging bus. Multiple test case subscribers can be used to receive the new test cases by way of messages of the test case topic on the messaging bus and to schedule executing test steps of respective test cases whether they comprise test steps of a sequential test step execution order and/or test steps of any order by publishing initial or independent test steps in messages of the test step topic on the messaging bus.

Multiple test step subscribers can be used to receive the messages of the test step topic on the messaging bus and to operate with multiple dependent test step subscribers to execute any test steps that are ordered in specific test step execution orders.

As soon as the underlying test steps in the test cases have completed successfully or failed, appropriate final test execution statues of the test cases can be determined by test case completion subscribers in response to messages or updates of the messages of the test case completion topic on the messaging bus.

Example tests as described herein may include, but are not necessarily limited to only, those related to any of: production system functionality, system functionality in various stages of development and/or test phases, functionality related to user experiences, checking login pool, orchestration of multiple services, accesses to multiple data centers and/or data stores, system or service health checks, ping checks, transactions, account creation, reporting software, results analysis, alerting, visualization, multi-step tests, data creation tests, data deletion tests, data entry tests, complicated and/or uncomplicated transactions, services exposed to user systems, internal services not exposed to user systems, HTTP-based operations, UI related functionality, web-based accesses, SMTP-based operations, FTP-based operations, network functionality, real-time operations, near-real-time operations, non-real-time operations, and so forth.

It has been described that dependent (or synchronous) test steps and/or independent (or non-synchronous) test steps in test cases can be executed under control based at least in part on asynchronous messages. It should be noted, however, that in various other embodiments, executions of operations other than test steps in a test case can be controlled with asynchronous messages. For example, non-test operations such as completing a login into a production database system, performing report generation operations with data stored in the production database system, performing distribution of reports, etc., can be executed based on asynchronous messages of various operation-execution-control topics of a messaging bus. For example, instead of or in addition to a test case topic, a database operational set topic may be used to publish information about database operational sets. Similarly, instead of or in addition to a test step topic, a database operation topic may be used to publish information about database operations in the database operational sets. Instead of or in addition to a dependent test step topic, a dependent database operation topic may be used to publish information about dependent database operations. Instead of or in addition to a test case completion topic, a database operation set completion topic may be used to publish information about database operation set completions. Thus, these and other variations may be used to control various types of operation sets and operations therein.

3.0 Example Embodiments

Figure 4:
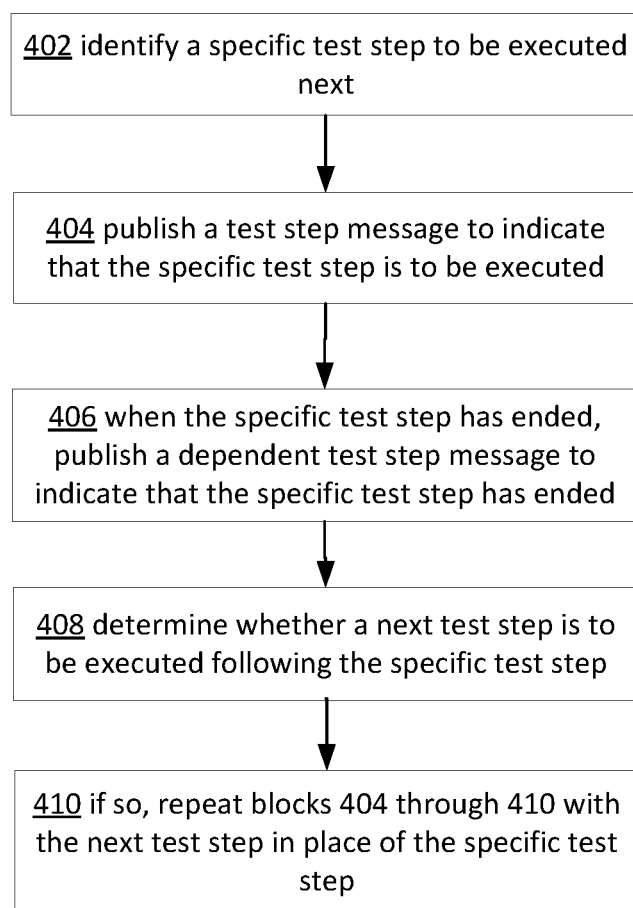
FIG. 4 illustrates an example process flow.

FIG. 4 illustrates an example process flow that may be implemented by a computing system (or device) as described herein. In block 402, a test execution engine (e.g., 124 of FIG. 1B, etc.) operating with a test agent (e.g., 118 of FIG. 1B, 118-1 through 118-N of FIG. 1A, etc.) identifies a specific test step to be executed next based at least in part on a test step execution order in a set of test steps for a test case.

In block 404, in response to identifying the specific test step to be executed next, the test execution engine (or a message publisher herein) publishes a test step message to indicate that the specific test step is to be executed next, the test step message as published causing a subscriber of the test step message to receive the test step message and execute the specific test step in response to receiving the test step message.

In block 406, in response to determining that the specific test step has ended, the test execution engine (or a message publisher therein) publishes a dependent test step message to indicate that the specific test step has ended, the dependent test step message as published causing a second different subscriber of the dependent test step message to receive the dependent test step message.

In block 408, in response to receiving the dependent test step message: the second different subscriber determines whether a next test step should be executed following the specific test step in the test step execution order.

In block 410, in response to determining that a next test step should be executed following the specific test step in the test step execution order, the test execution engine repeats blocks 404 through 410 by using the next test step in place of the specific test step.

In an embodiment, the test execution engine is further configured to perform: in response to determining that a next test step should not be executed following the specific test step in the test step execution order, publishing a test case completion message for the test case. The test case completion message causes a subscriber of the test case completion message to determine a final test execution status for the test case.

In an embodiment, to determine whether a next test step is to be executed following the specific test step in the test step execution order, the test execution engine is further configured to perform: determining whether the specific test step has completed successfully; in response to determining that the specific test step has completed successfully, determining whether the specific test step is the last test step in the test step execution order; in response to determining that the specific test step is not the last test step in the test step execution order, identifying the next test step in the test step execution order; etc.

In an embodiment, the test execution engine is further configured to perform: in response to determining that the specific test step has not completed successfully, publishing a test case completion message for the test case. The test case completion message causes a subscriber of the test case completion message to determine a final test execution status for the test case.

In an embodiment, the test execution engine is further configured to perform: in response to determining that the specific test step is the last test step in the test step execution order, publishing a test case completion message for the test case. The test case completion message causes a subscriber of the test case completion message to determine a final test execution status for the test case.

In an embodiment, the test step message is published and subscribed as a message of a test step topic on a messaging bus; the dependent test step message is published and subscribed as a message of a dependent test step topic on the messaging bus; the messaging bus further comprises a test case message published and subscribed as a message of a test case topic and a test case completion message published and subscribed as a message of a test case completion topic.

In an embodiment, the test step message is published by one of a test case subscriber or a subscriber of the dependent test step subscriber; the dependent test step message is published by the subscriber of the dependent test step subscriber.

In an embodiment, the specific test step represents an initial test step in the test step execution order; the test step message is published by a test case subscriber in response to receiving a test case message published by a test case scheduler.

In an embodiment, the test step execution order represents one of: a sequential test step execution, a parallel test step execution, a combination of the sequential test step execution and the parallel test step execution, and so forth.

In some embodiments, process flows involving operations, methods, etc., as described herein can be performed through one or more computing devices or units.

In an embodiment, an apparatus comprises a processor and is configured to perform any of these operations, methods, process flows, etc.

In an embodiment, a non-transitory computer readable storage medium, storing software instructions, which when executed by one or more processors cause performance of any of these operations, methods, process flows, etc.

In an embodiment, a computing device comprising one or more processors and one or more storage media storing a set of instructions which, when executed by the one or more processors, cause performance of any of these operations, methods, process flows, etc. Note that, although separate embodiments are discussed herein, any combination of embodiments and/or partial embodiments discussed herein may be combined to form further embodiments.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
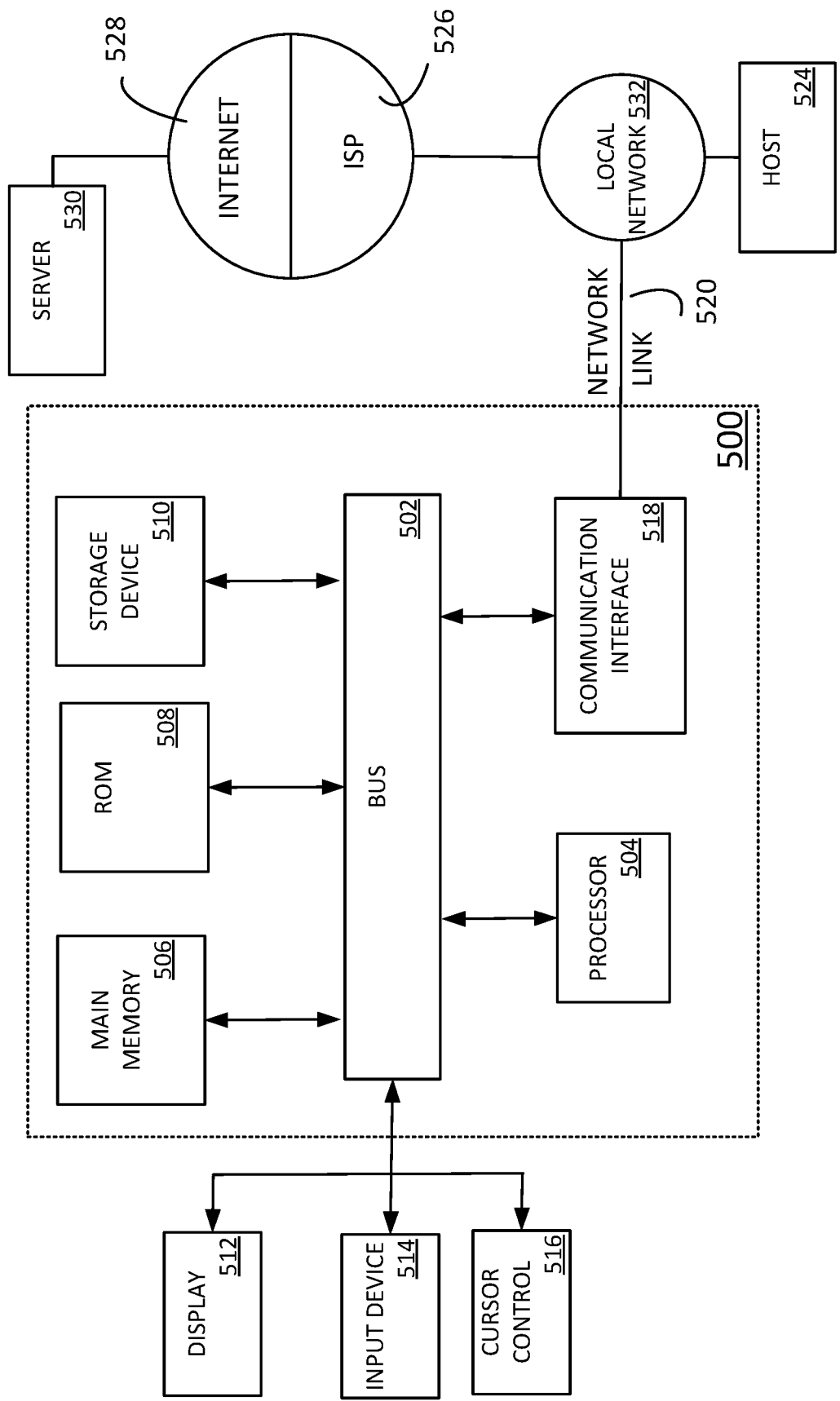
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

5.0 Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
    based at least in part on a test step execution order in a set of test steps for a test case, identifying a specific test step to be executed next;
    in response to identifying the specific test step to be executed next, performing:
        (a) publishing a test step message to indicate that the specific test step is to be executed next, the test step message as published causing a subscriber of the test step message to receive the test step message and execute the specific test step in response to receiving the test step message; and
        (b) in response to determining, by the subscriber of the test step message, that the specific test step has ended, publishing, by the subscriber of the test step message, a dependent test step message to indicate that the specific test step has ended, the dependent test step message as published causing a second different subscriber of the dependent test step message to receive the dependent test step message and perform in response to receiving the dependent test step message:
            determining whether a next test step should be executed following the specific test step in the test step execution order; and
            in response to determining that a next test step should be executed following the specific test step in the test step execution order, causing repeating steps (a) and (b) by using the next test step in place of the specific test step.

2. The method as recited in claim 1, further comprising: in response to determining that a next test step should not be executed following the specific test step in the test step execution order, publishing a test case completion message for the test case, wherein the test case completion message causes a subscriber of the test case completion message to determine a final test execution status for the test case.

3. The method as recited in claim 1, wherein determining whether a next test step is to be executed following the specific test step in the test step execution order comprises:
    determining whether the specific test step has completed successfully;
    in response to determining that the specific test step has completed successfully, determining whether the specific test step is the last test step in the test step execution order;
    in response to determining that the specific test step is not the last test step in the test step execution order, identifying the next test step in the test step execution order.

4. The method as recited in claim 3, further comprising: in response to determining that the specific test step has not completed successfully, publishing a test case completion message for the test case, wherein the test case completion message causes a subscriber of the test case completion message to determine a final test execution status for the test case.

5. The method as recited in claim 3, further comprising: in response to determining that the specific test step is the last test step in the test step execution order, publishing a test case completion message for the test case, wherein the test case completion message causes a subscriber of the test case completion message to determine a final test execution status for the test case.

6. The method as recited in claim 1, wherein the test step message is published and subscribed as a message of a test step topic on a messaging bus; wherein the dependent test step message is published and subscribed as a message of a dependent test step topic on the messaging bus; and wherein the messaging bus further comprises a test case message published and subscribed as a message of a test case topic and a test case completion message published and subscribed as a message of a test case completion topic.

7. The method as recited in claim 1, wherein the test step message is published by one of a test case subscriber or a subscriber of the dependent test step subscriber, and wherein the dependent test step message is published by the subscriber of the dependent test step subscriber.

8. The method as recited in claim 1, wherein the specific test step represents an initial test step in the test step execution order, wherein the test step message is published by a test case subscriber in response to receiving a test case message published by a test case scheduler, and wherein the test step execution order represents one of: a sequential test step execution, a parallel test step execution, or a combination of the sequential test step execution and the parallel test step execution.

9. One or more non-transitory computer readable media storing a program of instructions that is executable by a device to perform:
    based at least in part on a test step execution order in a set of test steps for a test case, identifying a specific test step to be executed next;

in response to identifying the specific test step to be executed next, performing:
  (a) publishing a test step message to indicate that the specific test step is to be executed next, the test step message as published causing a subscriber of the test step message to receive the test step message and execute the specific test step in response to receiving the test step message; and
  (b) in response to determining, by the subscriber of the test step message, that the specific test step has ended, publishing, by the subscriber of the test step message, a dependent test step message to indicate that the specific test step has ended, the dependent test step message as published causing a second different subscriber of the dependent test step message to receive the dependent test step message and perform in response to receiving the dependent test step message:
    determining whether a next test step should be executed following the specific test step in the test step execution order; and
    in response to determining that a next test step should be executed following the specific test step in the test step execution order, causing repeating steps (a) and (b) by using the next test step in place of the specific test step.

10. The media as recited in claim 9, wherein the program of instructions is executable by the device to further perform: in response to determining that a next test step should not be executed following the specific test step in the test step execution order, publishing a test case completion message for the test case, wherein the test case completion message causes a subscriber of the test case completion message to determine a final test execution status for the test case.

11. The media as recited in claim 9, wherein the program of instructions is executable by the device to further perform:
  determining whether the specific test step has completed successfully;
  in response to determining that the specific test step has completed successfully, determining whether the specific test step is the last test step in the test step execution order;
  in response to determining that the specific test step is not the last test step in the test step execution order, identifying the next test step in the test step execution order.

12. The media as recited in claim 11, wherein the program of instructions is executable by the device to further perform: in response to determining that the specific test step has not completed successfully, publishing a test case completion message for the test case, wherein the test case completion message causes a subscriber of the test case completion message to determine a final test execution status for the test case.

13. The media as recited in claim 11, wherein the program of instructions is executable by the device to further perform: in response to determining that the specific test step is the last test step in the test step execution order, publishing a test case completion message for the test case, wherein the test case completion message causes a subscriber of the test case completion message to determine a final test execution status for the test case.

14. The media as recited in claim 9, wherein the test step message is published and subscribed as a message of a test step topic on a messaging bus, wherein the dependent test step message is published and subscribed as a message of a dependent test step topic on the messaging bus and wherein the messaging bus further comprises a test case message published and subscribed as a message of a test case topic and a test case completion message published and subscribed as a message of a test case completion topic.

15. The media as recited in claim 9, wherein the test step message is published by one of a test case subscriber or a subscriber of the dependent test step subscriber, and wherein the dependent test step message is published by the subscriber of the dependent test step subscriber.

16. The media as recited in claim 9, wherein the specific test step represents an initial test step in the test step execution order, wherein the test step message is published by a test case subscriber in response to receiving a test case message published by a test case scheduler, wherein the test step execution order represents one of: a sequential test step execution, a parallel test step execution, or a combination of the sequential test step execution and the parallel test step execution.

17. A system, comprising:
  one or more computing processors;
  one or more non-transitory computer readable media storing a program of instructions that is executable by the one or more computing processors to perform:
    based at least in part on a test step execution order in a set of test steps for a test case, identifying a specific test step to be executed next;
    in response to identifying the specific test step to be executed next, performing:
      (a) publishing a test step message to indicate that the specific test step is to be executed next, the test step message as published causing a subscriber of the test step message to receive the test step message and execute the specific test step in response to receiving the test step message; and
      (b) in response to determining, by the subscriber of the test step message, that the specific test step has ended, publishing, by the subscriber of the test step message, a dependent test step message to indicate that the specific test step has ended, the dependent test step message as published causing a second different subscriber of the dependent test step message to receive the dependent test step message and perform in response to receiving the dependent test step message:
        determining whether a next test step should be executed following the specific test step in the test step execution order; and
        in response to determining that a next test step should be executed following the specific test step in the test step execution order, causing repeating steps (a) and (b) by using the next test step in place of the specific test step.

18. The system as recited in claim 17, wherein the program of instructions is executable by the device to further perform: in response to determining that a next test step should not be executed following the specific test step in the test step execution order, publishing a test case completion message for the test case, wherein the test case completion message causes a subscriber of the test case completion message to determine a final test execution status for the test case.

19. The system as recited in claim 17, wherein the program of instructions is executable by the device to further perform:

determining whether the specific test step has completed successfully;

in response to determining that the specific test step has completed successfully, determining whether the specific test step is the last test step in the test step execution order;

in response to determining that the specific test step is not the last test step in the test step execution order, identifying the next test step in the test step execution order.

20. The system as recited in claim 19, wherein the program of instructions is executable by the device to further perform: in response to determining that the specific test step has not completed successfully, publishing a test case completion message for the test case, wherein the test case completion message causes a subscriber of the test case completion message to determine a final test execution status for the test case.

21. The system as recited in claim 19, wherein the program of instructions is executable by the device to further perform: in response to determining that the specific test step is the last test step in the test step execution order, publishing a test case completion message for the test case, wherein the test case completion message causes a subscriber of the test case completion message to determine a final test execution status for the test case.

22. The system as recited in claim 17, wherein the test step message is published and subscribed as a message of a test step topic on a messaging bus, wherein the dependent test step message is published and subscribed as a message of a dependent test step topic on the messaging bus and wherein the messaging bus further comprises a test case message published and subscribed as a message of a test case topic and a test case completion message published and subscribed as a message of a test case completion topic.

23. The system as recited in claim 17, wherein the test step message is published by one of a test case subscriber or a subscriber of the dependent test step subscriber, and wherein the dependent test step message is published by the subscriber of the dependent test step subscriber.

24. The system as recited in claim 17, wherein the specific test step represents an initial test step in the test step execution order, wherein the test step message is published by a test case subscriber in response to receiving a test case message published by a test case scheduler, and wherein the test step execution order represents one of: a sequential test step execution, a parallel test step execution, or a combination of the sequential test step execution and the parallel test step execution.

* * * * *